(12) United States Patent
Sun

(10) Patent No.: US 8,759,746 B2
(45) Date of Patent: Jun. 24, 2014

(54) OPTICAL WHEEL, ROTARY ENCODER, LINEAR ENCODER AND METHOD FOR GENERATING A ZEROING SIGNAL OF A ROTARY ENCODER

(75) Inventor: Szu Cheng Sun, Milpitas, CA (US)

(73) Assignee: Szu Cheng Sun, Milpitas, CA (US)

( * ) Notice: Subject to any disclaimer, the term of this patent is extended or adjusted under 35 U.S.C. 154(b) by 240 days.

(21) Appl. No.: 13/187,897

(22) Filed: Jul. 21, 2011

(65) Prior Publication Data

US 2013/0020475 A1    Jan. 24, 2013

(51) Int. Cl.
*G01D 5/34* (2006.01)
*G01J 1/04* (2006.01)
*G02B 27/10* (2006.01)

(52) U.S. Cl.
USPC .................. 250/231.18; 250/231.13; 359/618

(58) Field of Classification Search
USPC ........... 250/231.13–231.18, 233, 236, 237 R, 250/237 G; 341/11, 13, 31; 359/618, 619, 359/621, 622, 624, 626; 356/616, 617
See application file for complete search history.

(56) References Cited

U.S. PATENT DOCUMENTS

| | | | | |
|---|---|---|---|---|
| 6,703,602 | B1 * | 3/2004 | Hao ......................... | 250/231.18 |
| 7,784,694 | B2 * | 8/2010 | Foo .............................. | 235/454 |
| 2004/0206894 | A1 * | 10/2004 | Oka et al. ................. | 250/231.13 |

* cited by examiner

*Primary Examiner* — Georgia Y Epps
*Assistant Examiner* — Don Williams
(74) *Attorney, Agent, or Firm* — Patterson Thuente Pedersen, P.A.

(57) ABSTRACT

A rotary encoder and an optical wheel for the rotary encoder are provided. The rotary encoder further includes a light source module, a code plate and an optical sensor module. The light source module is coupled with the code plate. The optical wheel is rotary, and has imaging elements arranged annularly; at least one of the imaging elements is coupled with the code plate. The optical sensor module is coupled with at least one of the imaging elements. The light source module emits lights to the code plate, and the lights passing through the code plate forms an image which is then transmitted to the optical sensor module via the imaging element. When the optical wheel rotates, the image moves accordingly. The optical sensor module senses that the image moves. A method for generating a zeroing signal of a rotary encoder and a liner encoder are also provided.

15 Claims, 16 Drawing Sheets

OPTICAL WHEEL, ROTARY ENCODER, LINEAR ENCODER AND METHOD FOR GENERATING A ZEROING SIGNAL OF A ROTARY ENCODER

CROSS-REFERENCES TO RELATED APPLICATIONS

Not applicable.

BACKGROUND OF THE INVENTION

1. Field of the Invention

The present invention provides a rotary encoder and an optical wheel for a rotary encoder. In particular, the present invention provides a rotary encoder and an optical wheel capable of effectively preventing the influence of dust or particles on the functions thereof. The present invention further provides a linear encoder, and more particularly, to a linear encoder capable of effectively preventing the influence of dusts or particles on the functions thereof.

2. Descriptions of the Related Art

Generally, a rotary encoder comprises a light source, an optical sensor and a code disk. The code disk is disposed between the light source and the optical sensor and can rotate relative to the light source and the optical sensor.

The code disk comprises a plurality of light transmitting regions alternating with a plurality of light non-transmitting regions. The light transmitting regions allow light emitted by the light source to pass therethrough and be sensed by the optical sensor. The non-transmitting regions block the light emitted by the light source from passing therethrough and, thus, prevent the light from being sensed by the optical sensor.

The number of the light transmitting regions and the light non-transmitting regions of the code disk has an influence on the resolution of the rotary encoder. Specifically, the larger the number of the light transmitting regions and the light non-transmitting regions there are, the higher the resolution of the rotary encoder will be. However, an increased number of the light transmitting regions and the light non-transmitting regions lead to smaller sizes of the light transmitting regions and the light non-transmitting regions, which makes the production of the code disk more difficult and adds to the production cost.

Furthermore, as the light transmitting regions become smaller in size, they become more susceptible to dust or particles. In detail, if the dust particles fall on a light transmitting region with a small size, the light transmitting region might be sheltered to prevent light from passing therethrough, thus degrading the accuracy or reliability of the rotary encoder. To overcome the aforesaid shortcoming, the rotary encoder must be preferably sealed during assembled to block entry of dusts or particles from the environment into the rotary encoder. However, this undesirably leads to an increase in the assembly cost of the rotary encoder.

In addition to the rotary encoder, linear encoders also have the same shortcomings.

In view of this, an urgent need exists in the art to provide a rotary encoder and a liner encoder capable of overcoming the aforesaid shortcomings.

SUMMARY OF THE INVENTION

The primary objective of the present invention is to provide a rotary encoder and an optical wheel for use in the rotary encoder. The optical wheel can replace the conventional code disk, by being easier to produce and less affected by dust or particles; moreover, the optical wheel can impart the rotary wheel with a higher resolution.

To achieve the aforesaid objective, the optical wheel of the present invention comprises: a wheel body, having a rotation axis; and a plurality of imaging elements, disposed fixedly on the wheel body and arranged annularly around the rotation axis, wherein each of the imaging elements has a focal point.

To achieve the aforesaid objective, the rotary encoder of the present invention comprises: a light source module disposed fixedly in the rotary encoder; a code plate, disposed fixedly in the rotary encoder and optically coupled with the light source module, wherein the code plate has a plurality of light transmitting regions alternating with a plurality of light non-transmitting regions; the optical wheel described above, wherein the wheel body is pivotally disposed in the rotary encoder with at least one of the imaging elements optically coupled with the code plate; and an optical sensor module, disposed fixedly in the rotary encoder and optically coupled with at least one of the imaging elements.

Another primary objective of the present invention is to provide a method for generating a zeroing signal of a rotary encoder, comprising the following steps: rotating the optical wheel of the rotary encoder described above, wherein the optical wheel further comprises a zeroing image element; making a plurality of light sources of the light source module emit lights in turn according to a switching speed higher than a rotating speed of the optical wheel; forming an image with a plurality of bright stripes and a plurality of dark stripes by the lights, which are emitted from one of the light sources and pass through the code plate and the zeroing imaging element; and generating the zeroing signal by the optical sensor module when the optical sensor module senses at least one of the bright stripes of the image.

Yet another primary objective of the present invention is to provide a liner encoder, which comprises the following: a light source module; a code plate, optically coupled with the light source module, wherein the code plate has a plurality of light transmitting regions alternating with a plurality of light non-transmitting regions; an optical bar, comprising a bar body and a plurality of imaging elements, wherein the bar body has a longitudinal direction and the imaging elements, each having a focal point, are disposed fixedly on the bar body and arranged in line along the longitudinal direction; and an optical sensor module, optically coupled with at least one of the imaging elements; wherein, the light source module, the code plate and the optical sensor module are capable of being translated against the optical bar.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
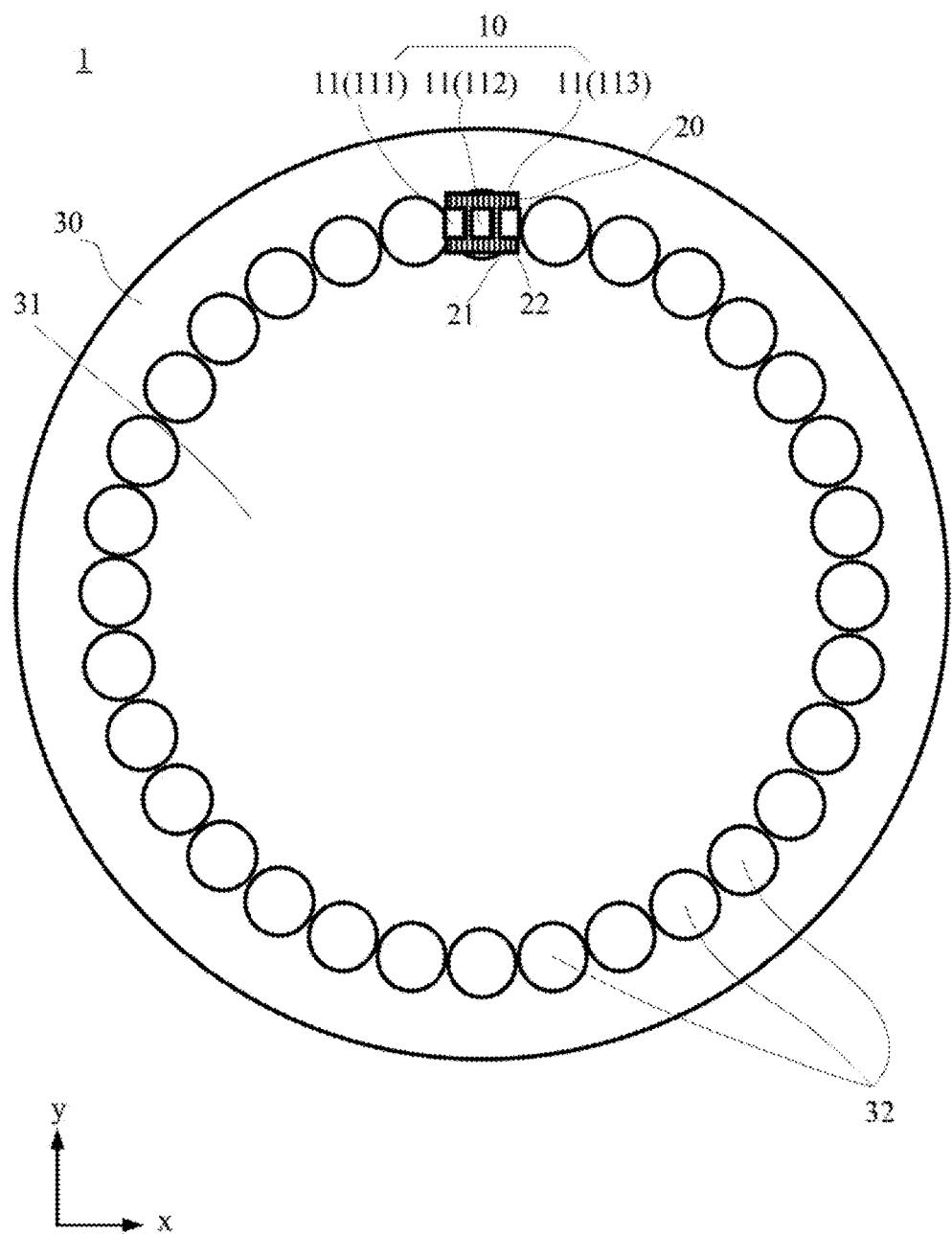
FIG. 1A is a front view of a rotary encoder according to the first preferred embodiment of the present invention.
Figure 2:
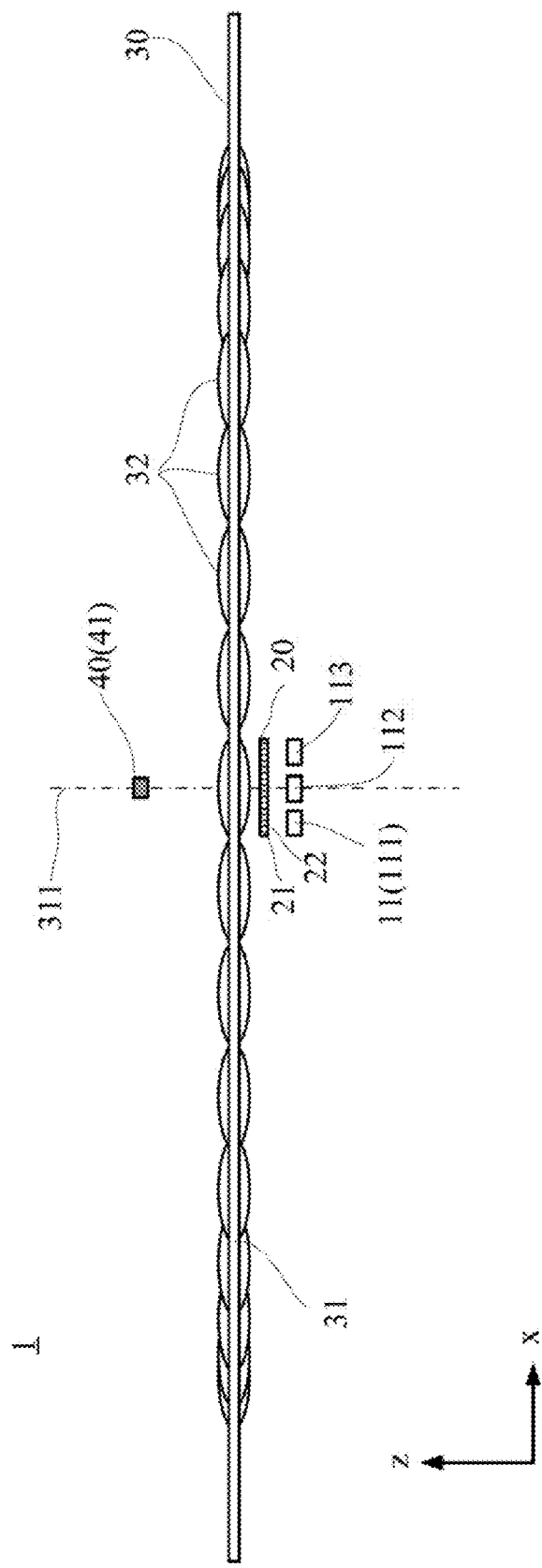
FIG. 2 is a top view of the rotary encoder according to the first preferred embodiment of the present invention.

FIGS. 1A and 2 illustrate the front and top view, respectively, of a rotary encoder according to the first preferred embodiment of the present invention. The rotary encoder 1 comprises a light source module 10, a code plate 20, an optical wheel 30 and an optical sensor module 40, which will be described in sequence hereinbelow.

The light source module 10 is disposed fixedly in the rotary encoder 1; i.e., the light source module 10 may be fixed to an enclosure, frame, shell, a base or any structure that suitable to fix the light source module 10 (not shown) of the rotary encoder 1 without free movement. The light source module 10 is adapted to emit light for the optical sensor module 40 to sense. The species of the light emitted by the light source module 10 is not particularly limited as long as it can be sensed and recognized by the optical sensor module 40; and in this embodiment, the light is a monochromatic light with a wavelength of 890 angstroms.

The light source module 10 may comprise a plurality of light sources 11. In this embodiment, the light source module 10 comprises three light sources 11 arranged linearly. Hereinafter, the three light sources 11 will be called as the first light source 111, the second light source 112 and the third light source 113 respectively for convenience of description. These light sources 11 may emit light simultaneously or separately. Each of the light sources 11 may be a light emitting diode (LED), so it can actually be made to be very small in volume.

Figure 1B:
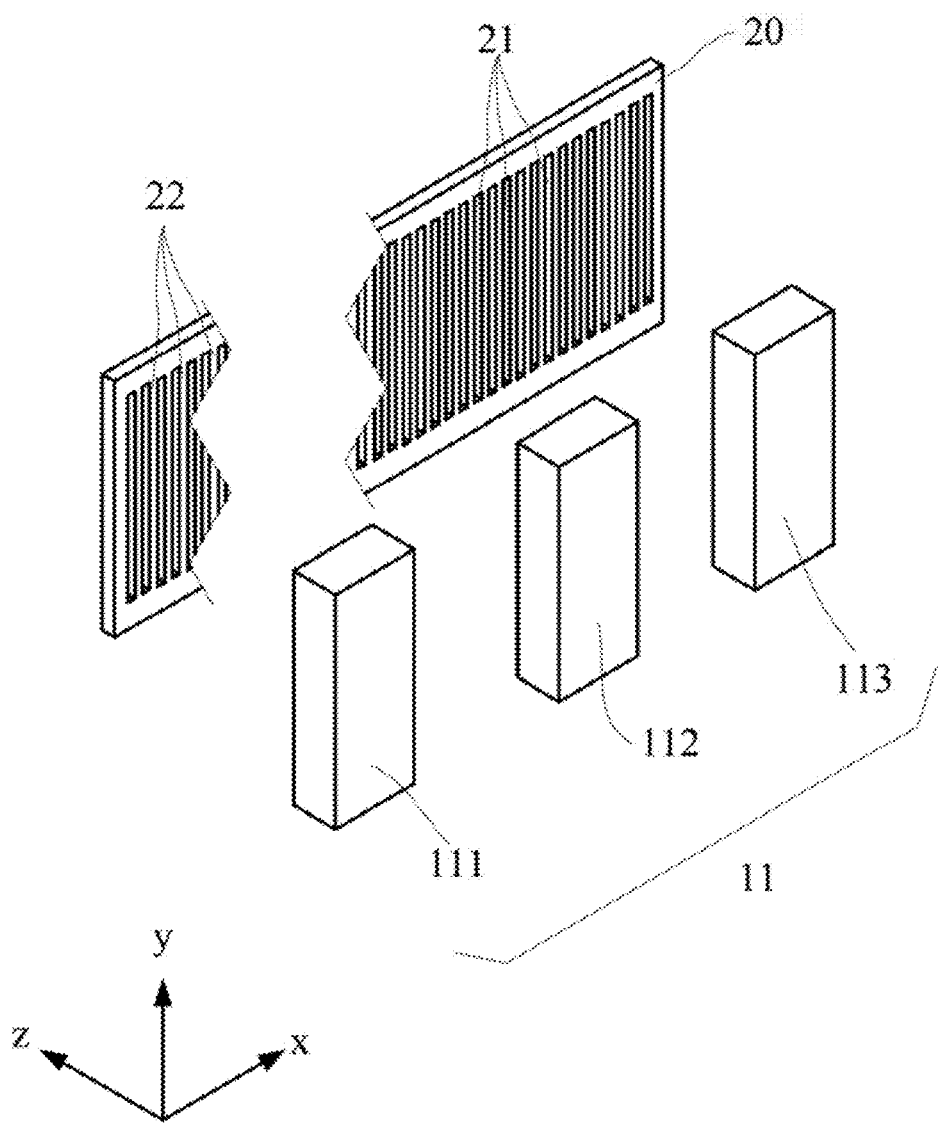
FIG. 1B is a perspective view of a code plate and a light source module of the rotary encoder according to the first preferred embodiment of the present invention.

In reference to FIG. 1B, the code plate 20 is disposed fixedly in the rotary encoder 1; i.e., the code plate 20 can be fixed to an enclosure or base (not shown) of the rotary encoder 1 without free movement. In other words, no relative movement will take place between the code plate 20 and the light source module 10. The code plate 20 is optically coupled with the light source module 10; i.e., light emitted by the light source module 10 (i.e., the light source 11) can be irradiated to the code plate 20. In this embodiment, the code plate 20 is disposed in front of and opposite to the light source module 10.

The code plate 20 has a plurality of light transmitting regions 21 alternating with a plurality of light non-transmitting regions 22. The light transmitting regions 21 are arranged in parallel with each other. In this embodiment, the number of light transmitting regions 21 is seventy two.

Figure 3:
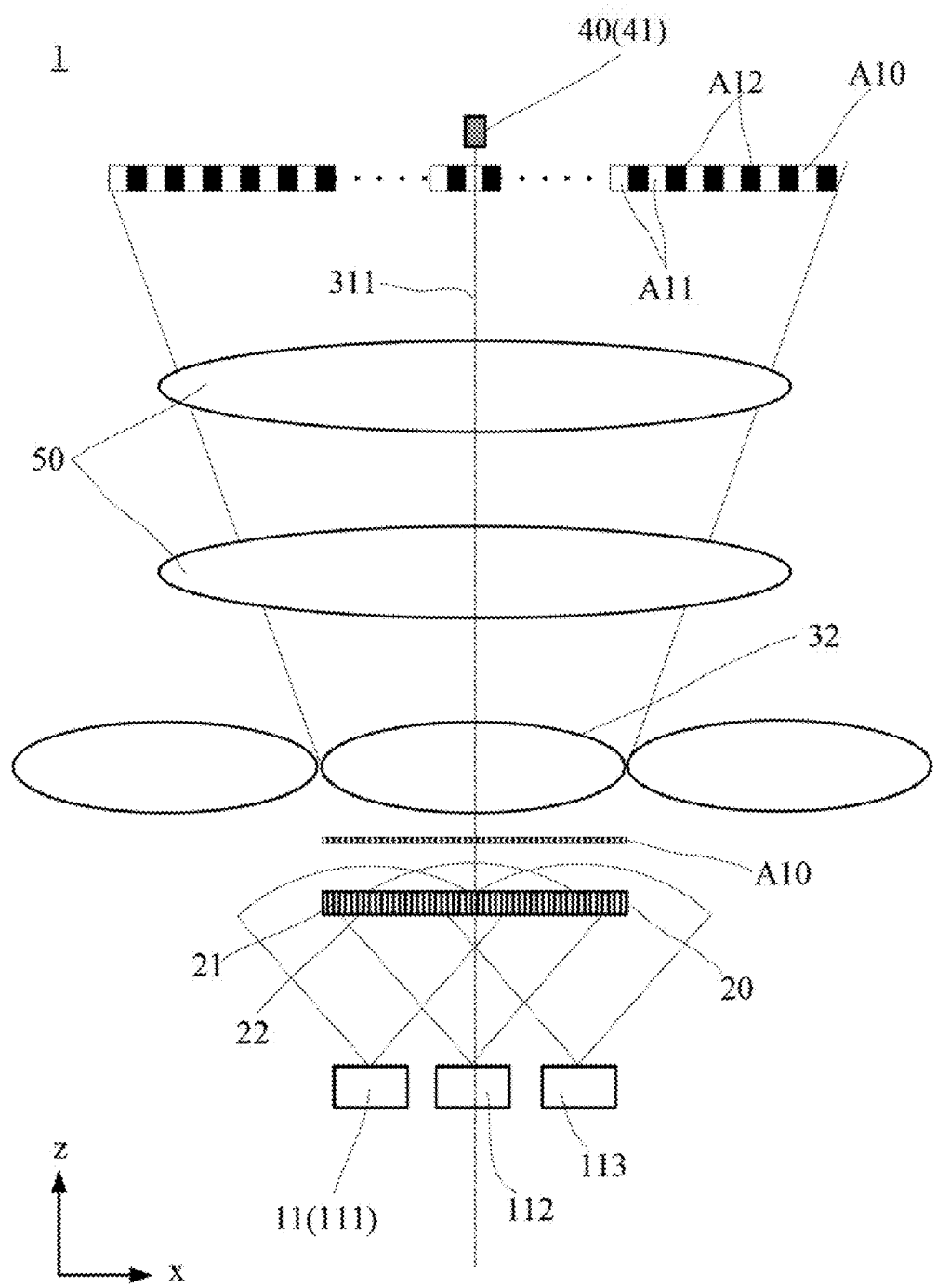
FIG. 3 is a schematic view illustrating the first operation mode of the rotary encoder according to the first preferred embodiment of the present invention.

The light transmitting regions 21 allow light to pass therethrough, while the light non-transmitting regions 21 do not allow light to pass therethrough. As a result, when light irradiates the code plate 20, a portion of the light will pass through the code plate 20 while the remaining portion will not. As shown in FIG. 3, light passing through the code plate 20 forms an image A10 with a plurality of bright stripes A11 alternating with a plurality of dark stripes A12; the numbers of the bright stripes A11 and the dark stripes A12 correspond to the numbers of the light transmitting regions 21 and the light non-transmitting regions 22, respectively.

There are various ways to form the light transmitting regions 21 and the light non-transmitting regions 22 on the code plate 20. As an example, the code plate 20 may be a glass plate with a plurality of non-transmissive materials coated thereon, in which the non-transmissive materials form the light non-transmitting regions 22 and the light transmitting regions 21 are formed between the light non-transmitting regions 22. Alternatively, the code plate 20 may be a non-transmissive solid plate with a plurality of through-grooves formed therein, in which the through-grooves form the light transmitting regions 21 and the light non-transmitting regions 22 are formed between the through-grooves. In this embodiment, the latter case will be described as an example.

The optical wheel 30 comprises a wheel body 31 and a plurality of imaging elements 32. In this embodiment, there are thirty two imaging elements 32 in total. The wheel body 31 is pivotally disposed in the rotary encoder 1; i.e., the wheel body 31 is pivotally connected to the enclosure or base (not shown) of the rotary encoder 1 and can be rotated by a drive shaft of a power source (e.g., a motor). In other words, the wheel body 31 can rotate relative to the light source module 10 and the code plate 20. The wheel body 31 has a rotation axis 311, and rotates about the rotation axis 311 when being rotated. It shall be noted that the rotation axis 311 is an imaginary axis used to represent the rotation center of the wheel body 31.

These imaging elements 32 are disposed fixedly on the wheel body 31; i.e., the imaging elements 32 cannot move relative to the wheel body 31, but rotates along the wheel body 31 instead. Additionally, the imaging elements 32 may be integrally formed with the wheel body 31. The imaging elements 32 are further arranged annularly around the rotation axis 311, with each of the imaging elements 32 placed at a substantially similar distance from the rotation axis 311. In other words, the imaging elements 32 are arranged continuously adjacent to each other around the rotation axis 311 to substantially form a ring. Thus, when rotating along with the wheel body 31, all the imaging elements 32 have the same circular rotation trajectory.

Figure 4:
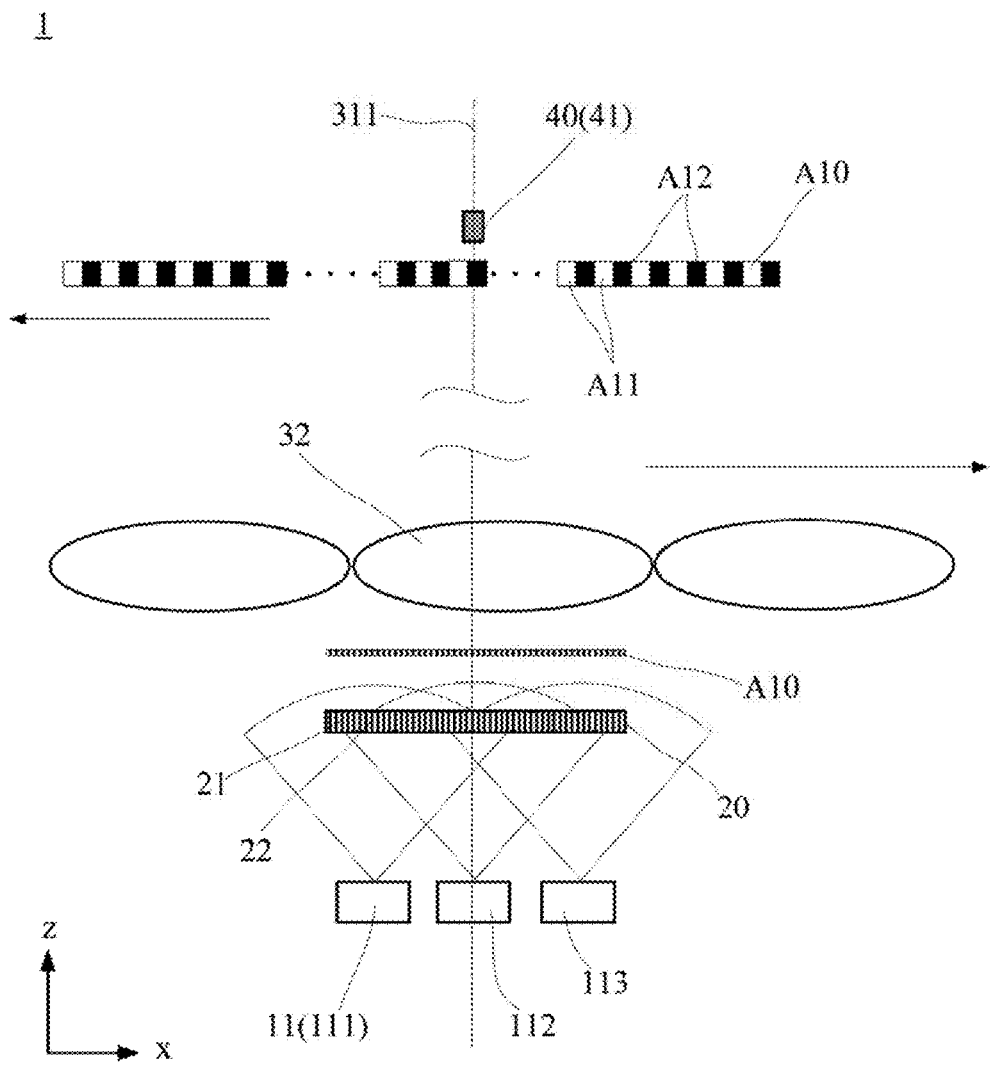
FIG. 4 is another schematic view illustrating the first operation mode of the rotary encoder according to the first preferred embodiment of the present invention.
Figure 5:
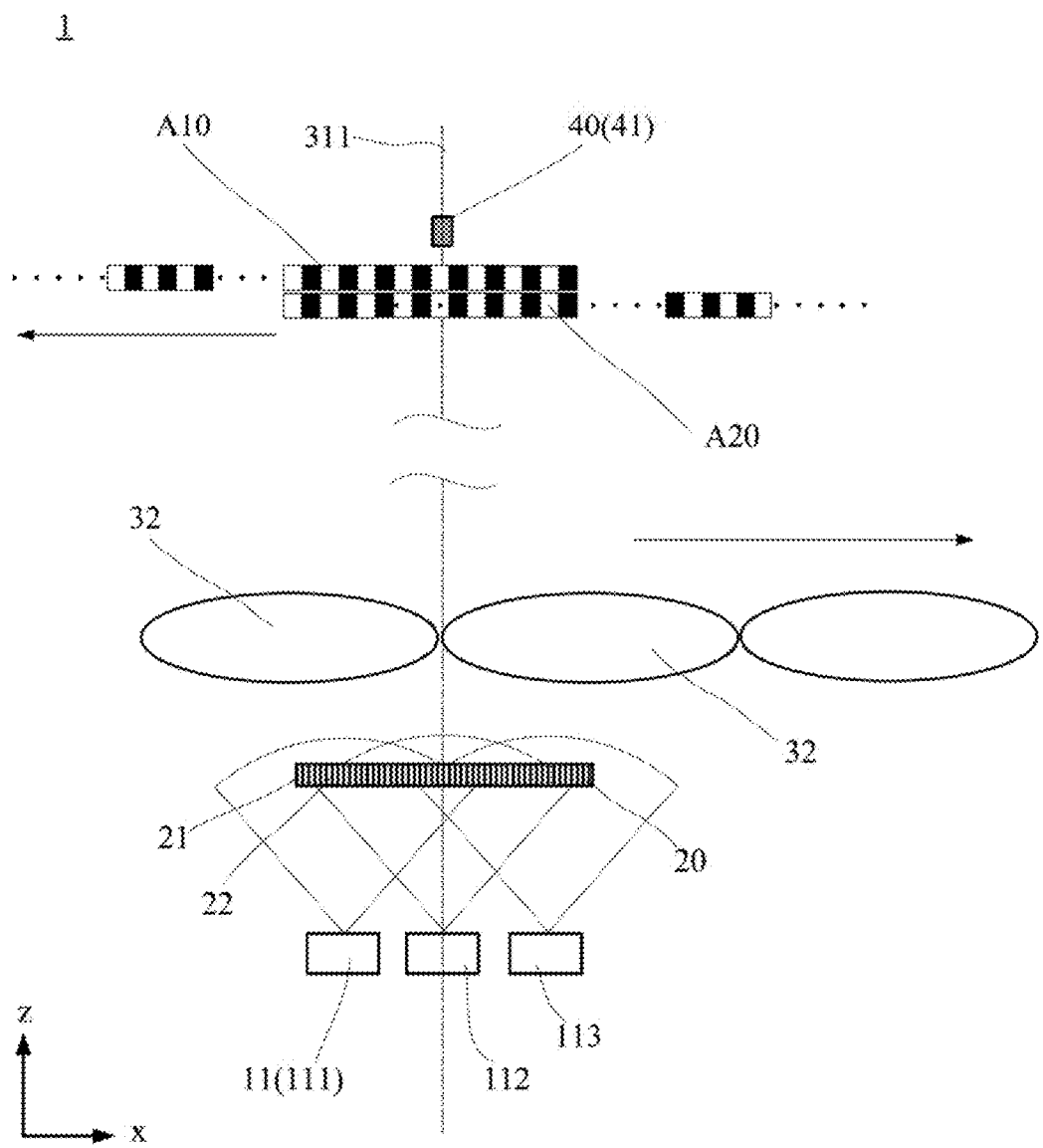
FIG. 5 is a further schematic view illustrating the first operation mode of the rotary encoder according to the first preferred embodiment of the present invention.

It shall be noted that the expression "the imaging elements 32 are arranged continuously adjacent to each other" means that any two adjacent imaging elements 32 are arranged to have a tiny spacing (or even no spacing) therebetween, so that images formed by the individual imaging elements 32 can be partially overlapped with each other (in reference to detailed descriptions made with reference to FIG. 3 through FIG. 5).

At least one of the imaging elements 32 is optically coupled to the code plate 20. That is, an image of the code plate 20 (i.e., light passing through the code plate 20) can propagate into at least one of the imaging elements 32 to be imaged (transferred) to the optical sensor module 40.

Furthermore, each of the imaging elements 32 for imaging purpose has a focal point. In this embodiment, each of the imaging elements 32 comprises a lens. Each of the imaging elements 32 is preferred to be a convex lens; alternatively, each of the imaging elements 32 may consist of a plurality of lenses and an equivalent focal point. Furthermore, each of the lenses of the imaging elements 32 may have an optical axis substantially parallel to the rotation axis 311. In other embodiments, the optical axes of the lenses of the imaging elements 32 may also intersect with the rotation axis 311 (not shown).

The optical sensor module 40 is disposed fixedly in the rotary encoder 1; i.e., the optical sensor module 40 can be fixed to an enclosure or a base (not shown) of the rotary encoder 1 without free movement. In other words, the optical sensor module 40, the light source module 10 and the code plate 20 cannot move relative to each other. The optical sensor module 40 comprises at least one optical sensor 41.

The optical sensor module 40 is optically coupled with at least one of the imaging elements 32; i.e., an image of the code plate 20 can be imaged by at least one of the imaging elements 32 onto the optical sensor module (i.e., an imaginary horizontal plane where the optical sensor module 40 is located). Because lenses are comprised in the imaging elements 32, the optical wheel 30 must be disposed between the code plate 20 and the optical sensor module 40 in order for the image of the code plate 20 to be imaged by the imaging elements 32 onto the optical sensor module 40.

Thus, the structure of the rotary encoder 1 has been described. Next, the operations of the rotary encoder 1 will be described hereinbelow.

FIG. 3 illustrates the first operation mode of the rotary encoder according to the first preferred embodiment of the present invention. During the operation of the rotary encoder 1, the light sources 11 of the light source module 10 emit light simultaneously. A portion of the light passes through the code plate 20 and then forms an image A10 with bright stripes A11 alternating with dark stripes A12 at the back of the code plate 20. Here, there are eighty bright stripes A11 in total.

The image A10 further propagates to the optical sensor module 40 via the imaging elements 32 disposed at the downstream of the code plate 20. In the process of propagating to the optical sensor module 40, the image A10 is enlarged by the imaging elements 32. A relay lens set 50 may be optionally disposed between the imaging elements 32 and the optical sensor module 40 to further adjust (i.e., zoom in or zoom out) the size of the image A10. It shall be noted that some of the bright stripes A11 and the dark stripes A12 are not depicted herein.

The optical sensor 41 of the optical sensor module 40 is irradiated by a part of the image A10. The optical sensor 41 outputs a signal when it is irradiated by a bright stripe A11 of the image A10, and outputs no signal when it is irradiated by a dark stripe A12. The sensing range of the optical sensor 41 is substantially smaller than the width of the enlarged bright stripe A11 or the enlarged dark stripe A12.

It is worth noting that the sensing range of the optical sensor 41 is correlated with only the width of the bright stripe A11, so the imaging elements 32 may only enlarge the width of the bright stripe A11 but not enlarge the length thereof when enlarging the image A10. For this reason, the lens comprised in each of the imaging elements 32 may be a cylindrical lens.

In reference to FIG. 4, there is another schematic view illustrating the first operation mode of the rotary encoder according to the first preferred embodiment of the present invention with the relay lens set being omitted. When the optical wheel 30 rotates from the state shown in FIG. 3, the imaging element 32 is translated relative to the optical sensor module 40 and, accordingly, the image A10 transferred by the imaging element 32 is also translated relative to the optical sensor module 40 but in a direction opposite to the movement of the imaging element 32.

As the image A10 is translated, the optical sensor 41 is intermittently irradiated by the bright stripes A11 and outputs signals correspondingly. When the optical wheel 30 rotates faster, the image A10 will be translated at a higher speed and, correspondingly, the frequency at which the optical sensor 41 outputs the signals will become higher. Therefore, the rotating speed of the optical wheel 30 can be calculated according to the frequency at which the signals are outputted.

FIG. 5 further illustrates the first operation mode of the rotary encoder 1 according to the first preferred embodiment of the present invention. When the optical wheel 30 further rotates from the state shown in FIG. 4, two of the imaging elements 32 are optically coupled with the code plate 20 respectively. At this point, besides that the image A10 is formed, a part of the light emitted by the light source module 10 passes through the code plate 20 and is then transferred by the other imaging element 32 to the optical sensor 41 to form an image A20.

The last eight bright stripes of the image A10 and the first eight bright stripes of the image A20 overlap with each other; in other words, the image A10 and the image A20 are continuous with each other without any interruption, and the optical sensor 41 is irradiated by the overlapped portion of the image A10 and the image A20. It shall be appreciated that the image A10 and the image A20 are shown to have spacing in the Z direction in order to clearly distinguish them; however, there may be no spacing between the image A10 and the image A20 in the Z direction in practice.

When the optical wheel 30 further rotates from the state shown in FIG. 5, the image A10 disappears gradually, and then the optical sensor 41 is irradiated by the image A20 alone (similar to what is shown in FIG. 3).

As can be known from the above descriptions that as the optical wheel 30 rotates continuously, each of the imaging elements 32 comes into the light coupling range of the code plate 20 successively to form an image on the optical sensor 41 and then exits from the light coupling range. Accordingly, a process of "forming an image", "translating the image", "partially overlapping with a next image" and "disappearing" will be repeated for each image formed by the imaging elements 32.

Seventy two bright stripes pass through the optical sensor 41 successively when each imaging element 32 passes through the light coupling range of the code plate 20. However, among the seventy two bright stripes, the first eight are overlapped with a previous image and the last eight are overlapped with a next image. Therefore, 2048 bright stripes in total are irradiated onto the optical sensor 41 successively after the thirty two imaging elements 32 pass through the light coupling range of the code plate 20 (i.e., after the optical wheel 30 rotates by 360°).

The total number of bright stripes is calculated as follows: "the number of imaging elements 32" multiplied by ("the number of non-overlapped bright stripes"+"a half of the number of the overlapped bright stripes"); i.e. 32×(56+0.5×16).

Accordingly, the optical sensor 41 outputs 2048 signals in total after the optical wheel 30 rotates by 360°. Each output signal represents a rotation of 0.176° of the optical wheel 30, and this angle is just the resolution of the rotary encoder 1.

Because there are both overlapping bright stripes and non-overlapping bright stripes, each of the light transmitting regions 21 of the code plate 20 may also be divided into a non-overlapping light transmitting region and an overlapping light transmitting region. The bright stripe generated when light passing through the overlapping light transmitting region will also be overlapped with another image.

In this embodiment, the first eight and the last eight light transmitting regions are overlapping light transmitting regions, while the fifty six middle ones are non-overlapping light transmitting regions. The resolution of the rotary encoder 1 is equal to 360 divided by the total number of bright stripes. As can be known from this, the resolution of the rotary encoder 1 is correlated with the number of the imaging elements 32 and the number of the light transmitting regions 21. By increasing the number of the imaging elements 32 or the light transmitting regions 21, the resolution of the rotary encoder 1 can be increased.

Figure 6:
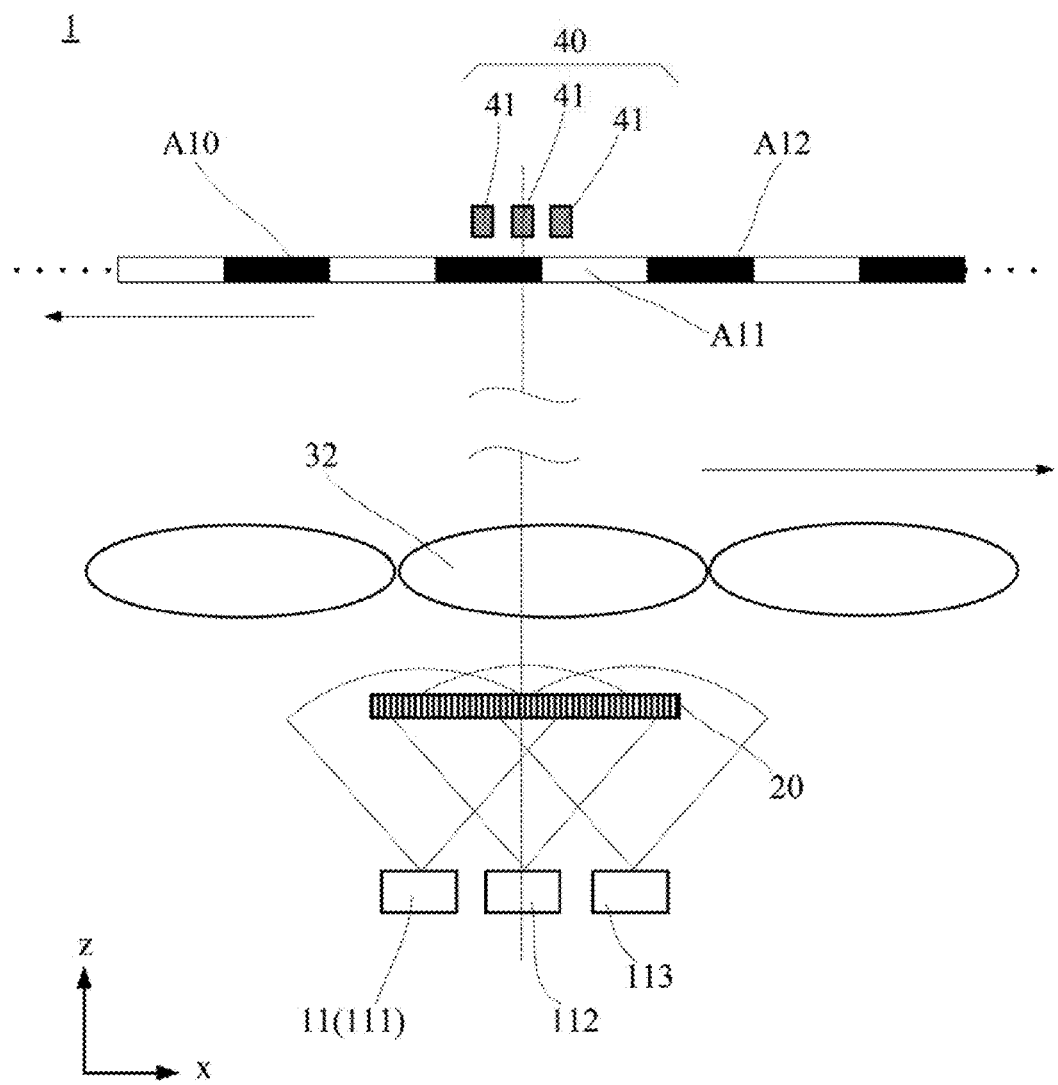
FIG. 6 is yet another schematic view illustrating the first operation mode of the rotary encoder according to the first preferred embodiment of the present invention.

In addition, the resolution of the rotary encoder 1 may be further increased significantly by increasing the number of optical sensors 41. In reference to FIG. 6, there is yet another schematic view illustrating the first operation mode of the rotary encoder according to the first preferred embodiment of the present invention with the relay lens set being omitted. Here, the number of the optical sensors 41 of the rotary encoder 1 is increased to three. The three optical sensors 41 may be arranged linearly and have a total sensing range not exceeding the width of the enlarged bright stripes A11. It shall be appreciated that as compared to what is shown in FIG. 3, the width of the bright stripes A11 in FIG. 6 is enlarged to a greater extent so that the optical sensors 41 will not go beyond the width of one enlarged bright stripe A11. When one of the bright stripes A11 passes through the optical sensor module 40, each of the three optical sensor module 41 outputs a signal in sequence; in other words, the optical sensor module 40 outputs three signals in total. Accordingly, 6144 signals (2048 bright stripes multiplied by three signals per bright stripe) are outputted by the optical sensor module 40 when the optical wheel 30 rotates by 360°; i.e., each output signal represents a rotation of 0.0586° of the optical wheel 30.

As can be known, the increase in the number of the optical sensors 41 is greatly helpful in improving the resolution of the rotary encoder 1.

The first operation mode of the rotary encoder 1 has been described above. Other operation modes of the rotary encoder 1 will be described hereinbelow.

Figure 7:
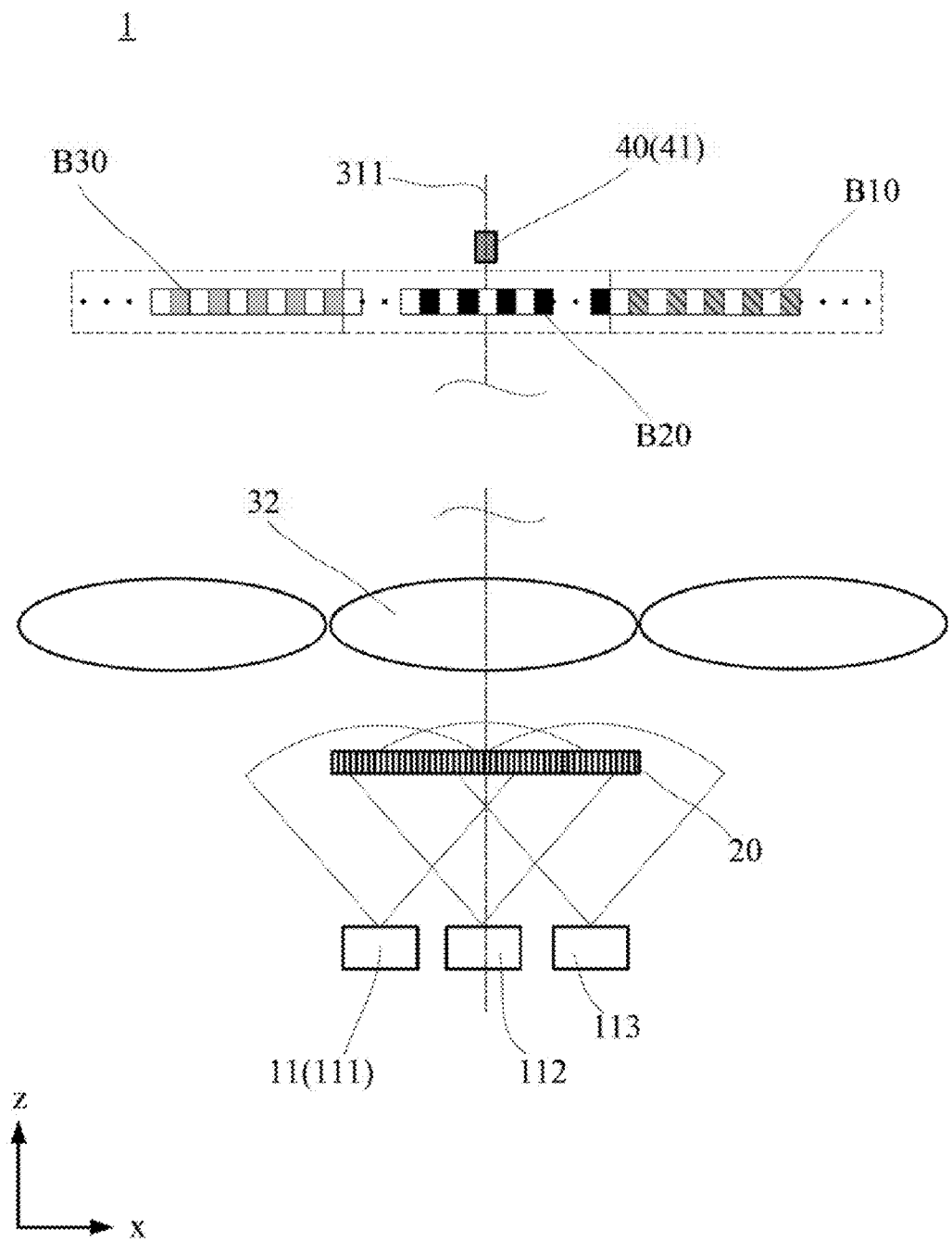
FIG. 7 is a schematic view illustrating the second operation mode of the rotary encoder according to the first preferred embodiment of the present invention.

FIG. 7 illustrates a schematic view of the second operation mode of the rotary encoder according to the first preferred embodiment of the present invention with an omitted relay lens set. In the second operation mode, the three light sources 11 of the light source module 10 emit light in turn but not simultaneously; in other words, each of the three light sources 11 emits light by blinking and not by staying on continuously. Furthermore, the three light sources 11 emit light in turn at a switching speed higher than the rotating speed of the optical wheel 30. For example, the optical wheel 30 has a maximum rotation speed of 1000 revolutions per minute (RPM), but the three light sources 11 can be switched at a speed of 300 thousands times per second, which is much higher than the rotating speed of the optical wheel 30.

The light emitted by the first light source 111 can pass through twenty four of the light transmitting regions 21 of the code plate 20 and then be imaged into an enlarged first image B10 by the imaging elements 32. Light emitted by second light source 112 can pass through another twenty four of the light transmitting regions 21 of the code plate 20 and then be imaged into an enlarged second image B20 by the imaging elements 32. Light emitted by the third light source 111 can pass through the remaining twenty four of the light transmitting regions 21 of the code plate 20 and then be imaged into an enlarged third image B30 by the imaging elements 32. As the three light sources 11 emit light in turn, the first image B10, the second image B20 and the third image B30 also appear in turn but not simultaneously.

As the optical wheel 30 rotates, the first image B10, the second image B20 and the third image B30 are translated accordingly. In addition to movement of the bright stripes of the images, the blinking of the bright stripes themselves can also be sensed by the optical sensor 41. The blinking frequency of the bright stripes is equal to the blinking frequency of the light sources 11. Because the blinking frequency of the bright stripes is much higher than the moving speed of the bright stripes, a high-frequency signal resulting from the flickering of the bright stripes can be readily identified without affecting the determination of the rotating speed of the optical wheel 30.

The object of having the three light sources 11 emit light in turn is to determine whether the bright stripe of an image sensed by the optical sensor 41 overlaps with the bright stripe of another image; a detailed description of which is described as follows.

Figure 8:
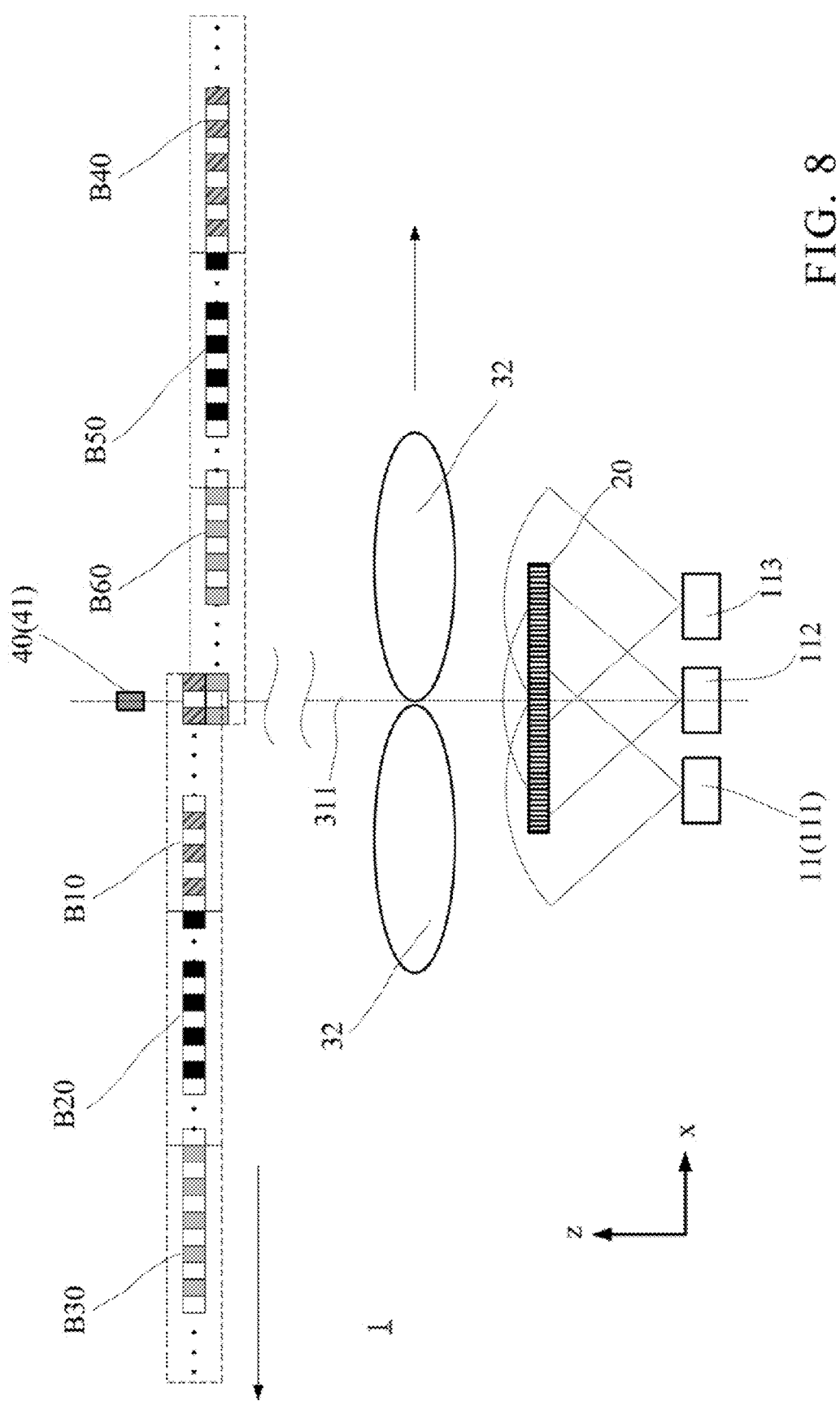
FIG. 8 is another schematic view illustrating the second operation mode of the rotary encoder according to the first preferred embodiment of the present invention.

FIG. 8 illustrates another schematic view of the second operation mode of the rotary encoder according to the first preferred embodiment of the present invention. When the optical wheel 30 further rotates from the state shown in FIG. 6, two imaging elements 32 are optically coupled with the code plate 20 respectively. At this point, besides the first image B10 to the third image B30 are formed, lights emitted by the three light sources 11 also pass through the code plate 20 and is transferred by another imaging element 32 to the optical sensor 41 to form a fourth image B40, a fifth image B50 and a sixth image B60 respectively. The sixth image B60 is partially overlapped with the first image B10.

When the first light source 111 emits light, the first image B10 and the fourth image B40 are formed simultaneously; when the second light source 112 emits light, the second image B20 and the fifth image B50 are formed simultaneously; and when the third light source 113 emits light, the third image B30 and the sixth image B60 are formed simultaneously.

When being irradiated by a bright stripe that overlaps between the sixth image B60 and the first image B10, the optical sensor 41 outputs a signal no matter it is the first light source 111 or the third light source 113 emitting light. However, when the optical sensor 41 is irradiated by a non-overlapping bright stripe of the sixth image B60, a signal can be outputted only when the third light source 113 emits light.

In other words, if, within an extremely short time period, the two images formed by two of the light sources 11 (e.g., the first light source 111 and the third light source 113) both excite the optical sensor 41 to output a signal, this means that there is an overlap between the two images and also that there are two imaging elements 32 optically coupled (engaged) with the code plate 20.

The second operation mode of the rotary encoder 1 has been described above. Next, other preferred embodiments of the rotary encoder of the present invention will be further described.

Figure 9:
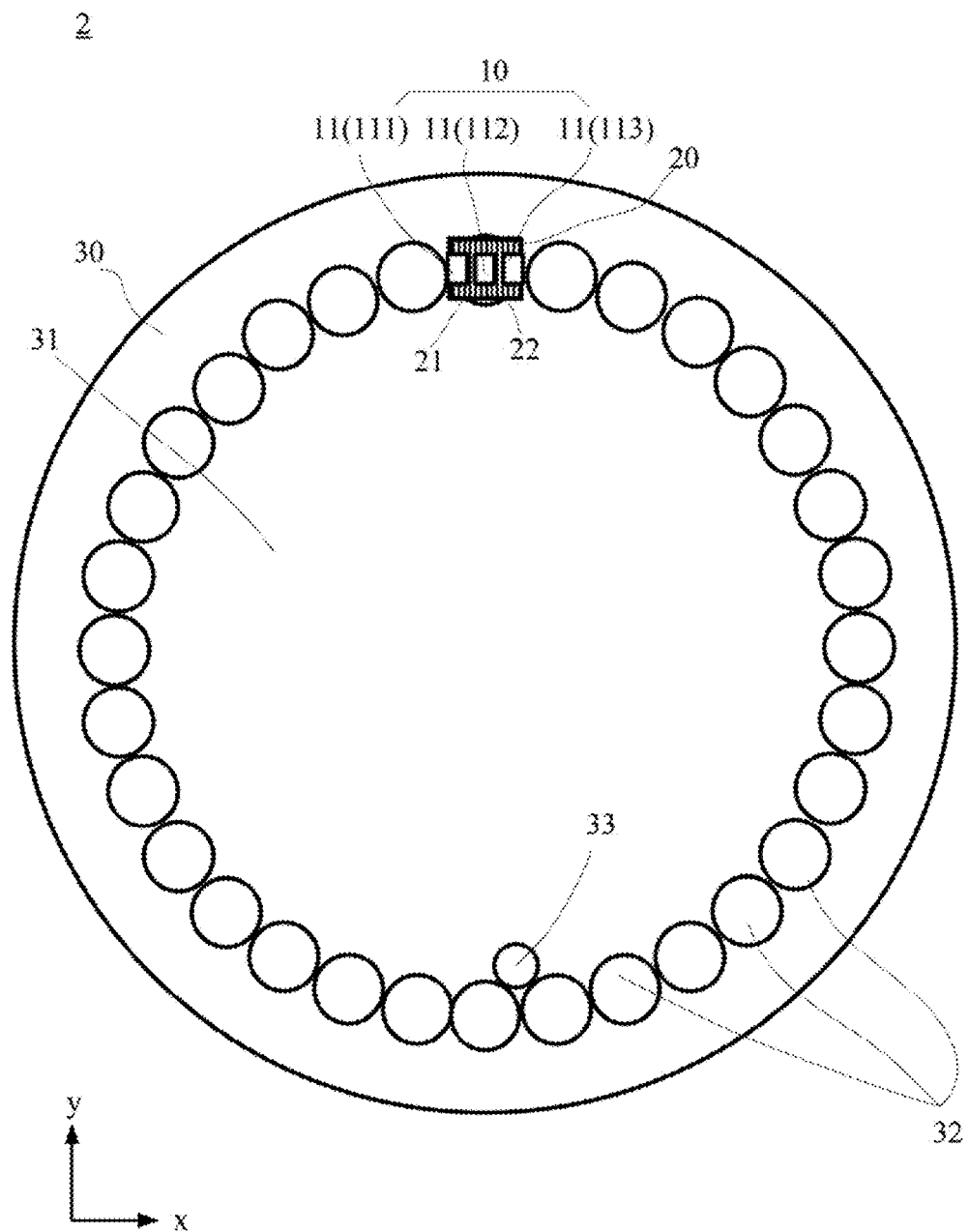
FIG. 9 is a front view of a rotary encoder according to the second preferred embodiment of the present invention.

FIG. 9 illustrates the front view of a rotary encoder according to the second preferred embodiment of the present invention. As compared to the rotary encoder 1, an optical wheel 30 of a rotary encoder 2 of this embodiment further comprises a zeroing imaging element 33. The zeroing imaging element 33 is also disposed fixedly on the wheel body 31 and adjacent to two of the imaging elements 32. The zeroing imaging element 33 may comprise a lens and is preferably a convex lens.

The zeroing imaging element 33 is adapted to define the origin of the rotation of the optical wheel 30 to further count revolutions that the optical wheel 30 has rotated. In detail, when the zeroing imaging element 33 rotates between the code plate 20 and the optical sensor module 40, light passing through the code plate 20 will form an additional image (not shown) at the optical sensor module 40 via the zeroing imaging element 33. The optical sensor module 40 outputs an index signal when a bright stripe of the additional image is sensed. Therefore, each index signal outputted by the optical sensor module 40 represents one revolution (i.e., 360°) of rotation of the optical wheel 30.

By using the zeroing imaging element 33, a method for generating the zeroing signal of a rotary encoder can be implemented, which are described as follows.

With reference to FIG. 8 as well, two of the imaging elements 32 are optically coupled with the code plate 20 when the optical wheel 30 rotates. If the zeroing imaging element 33 is not disposed between the two imaging elements 32, then the optical sensor 41 outputs no signal when the second light source 112 emits light as described above; instead, the optical sensor 41 outputs a signal only when the first light source 111 or the third light source 113 emits light. Therefore, if the optical sensor 41 outputs no signal when the second light source 112 emits light, then this means that the optical wheel 30 has not rotated to a zeroing position.

Figure 10:
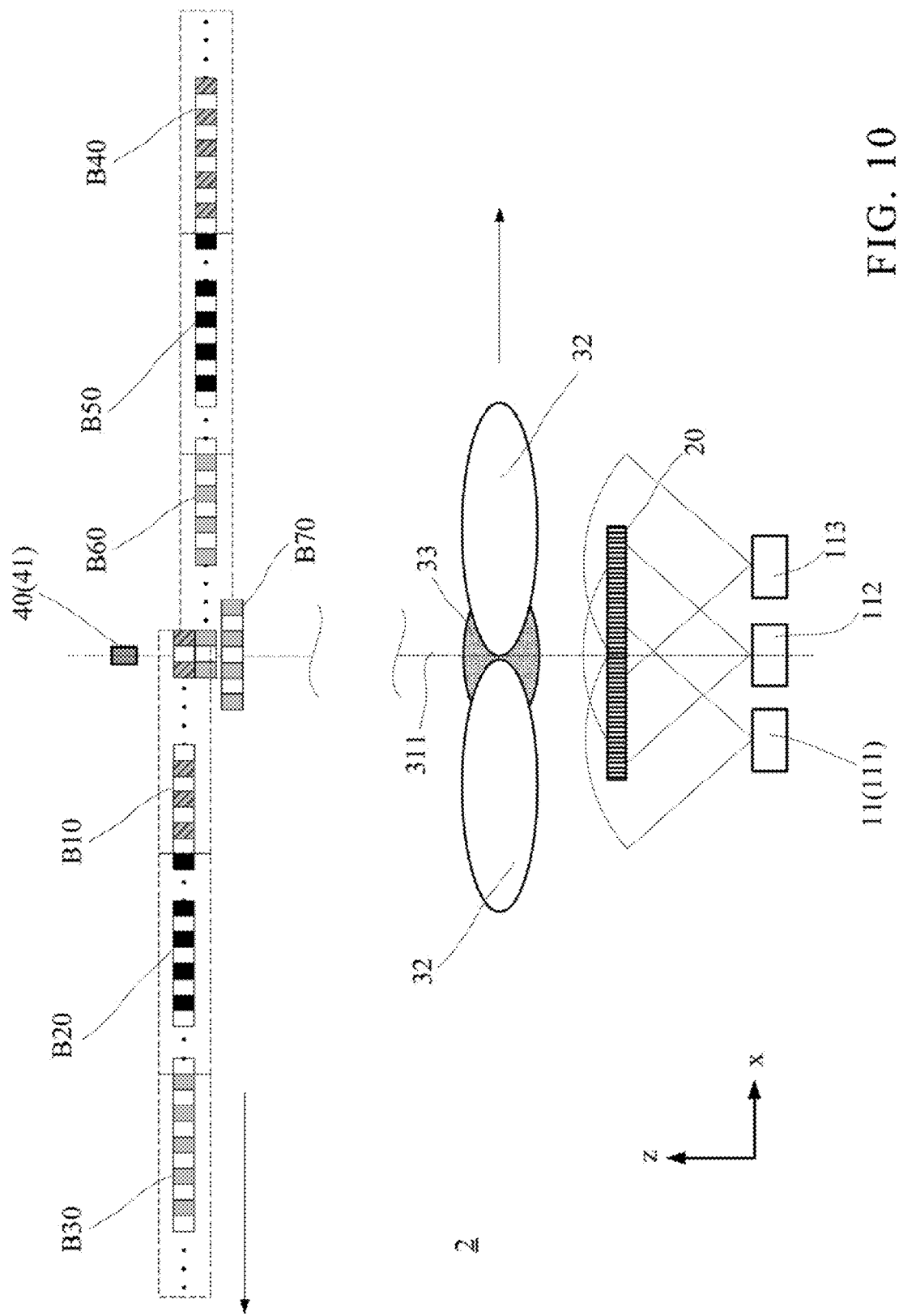
FIG. 10 is a schematic view illustrating an operation mode of the rotary encoder according to the second preferred embodiment of the present invention.

FIG. 10 illustrates a schematic view of an operation mode of the rotary encoder according to the second preferred embodiment of the present invention. When the optical wheel 30 rotates to the zeroing position, the zeroing imaging element 33 will show up between two of the imaging elements 32. At this point, the light emitted by the second light source 112 passes through the code plate 30 and the zeroing imaging element 33 to form a seventh image B70 with a plurality of bright stripes and a plurality of dark stripes at the optical sensor 41. After at least one of the bright stripes of the seventh image B70 is sensed by the optical sensor 41, the optical sensor 41 will output a signal; and this signal is just the zeroing signal (or termed as an index signal).

As can be known from the above descriptions, if, within an extremely short time period, images formed by both the first light source 111 and the third light source 113 can excite the optical sensor 41 to output a signal respectively, this means that two of the imaging elements 32 are coupled with the code plate 20; and if the image formed by the second light source 12 also excites the optical sensor 41 to output a signal, then this means that two of the imaging elements 32 are coupled with the code plate 20 and also that the optical wheel 30 has rotated to the zeroing position.

It shall further be noted that the seventh image B70 formed by the zeroing imaging element 33 may be sensed by an additional optical sensor (not shown).

Figure 11:
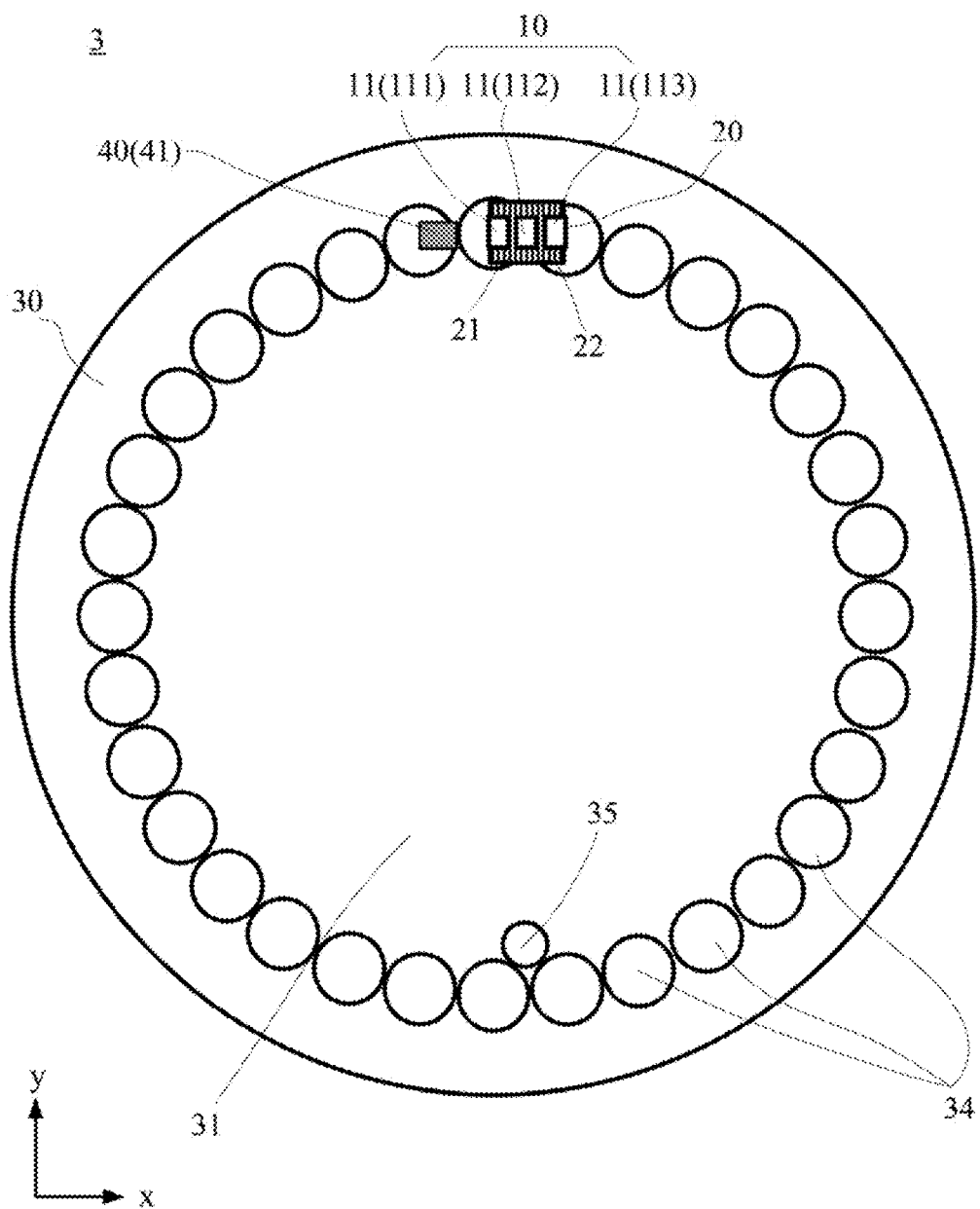
FIG. 11 is a front view of a rotary encoder according to the third preferred embodiment of the present invention.
Figure 12:
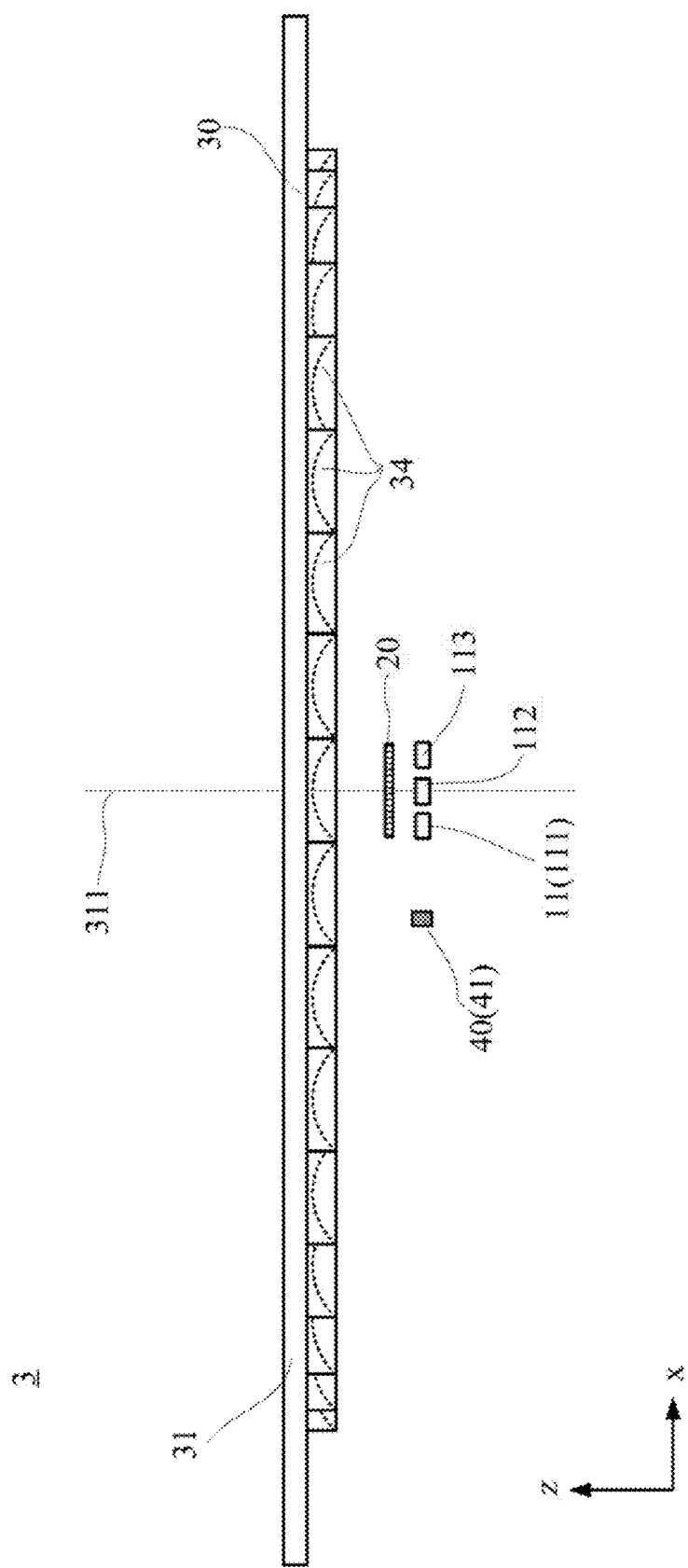
FIG. 12 is a top view of the rotary encoder according to the third preferred embodiment of the present invention.

FIGS. 11 and 12 illustrate the front view and top view of a rotary encoder according to the third preferred embodiment of the present invention, respectively. As compared to the rotary encoder 1 and the rotary encoder 2, an optical wheel 30 of a rotary encoder 3 of this embodiment comprises a plurality of imaging elements 34, each of which comprises no lens but instead, comprises a concave mirror. Additionally, the code plate 20 and the optical sensor module 40 are located on the same side of the optical wheel 30 so as to be optically coupled with the imaging elements 34 successfully.

It is worth noting that because the code plate 20 and the optical sensor module 40 are located on the same side of the optical wheel 30, the rotary encoder 1 may be made to have a smaller thickness.

Figure 13:
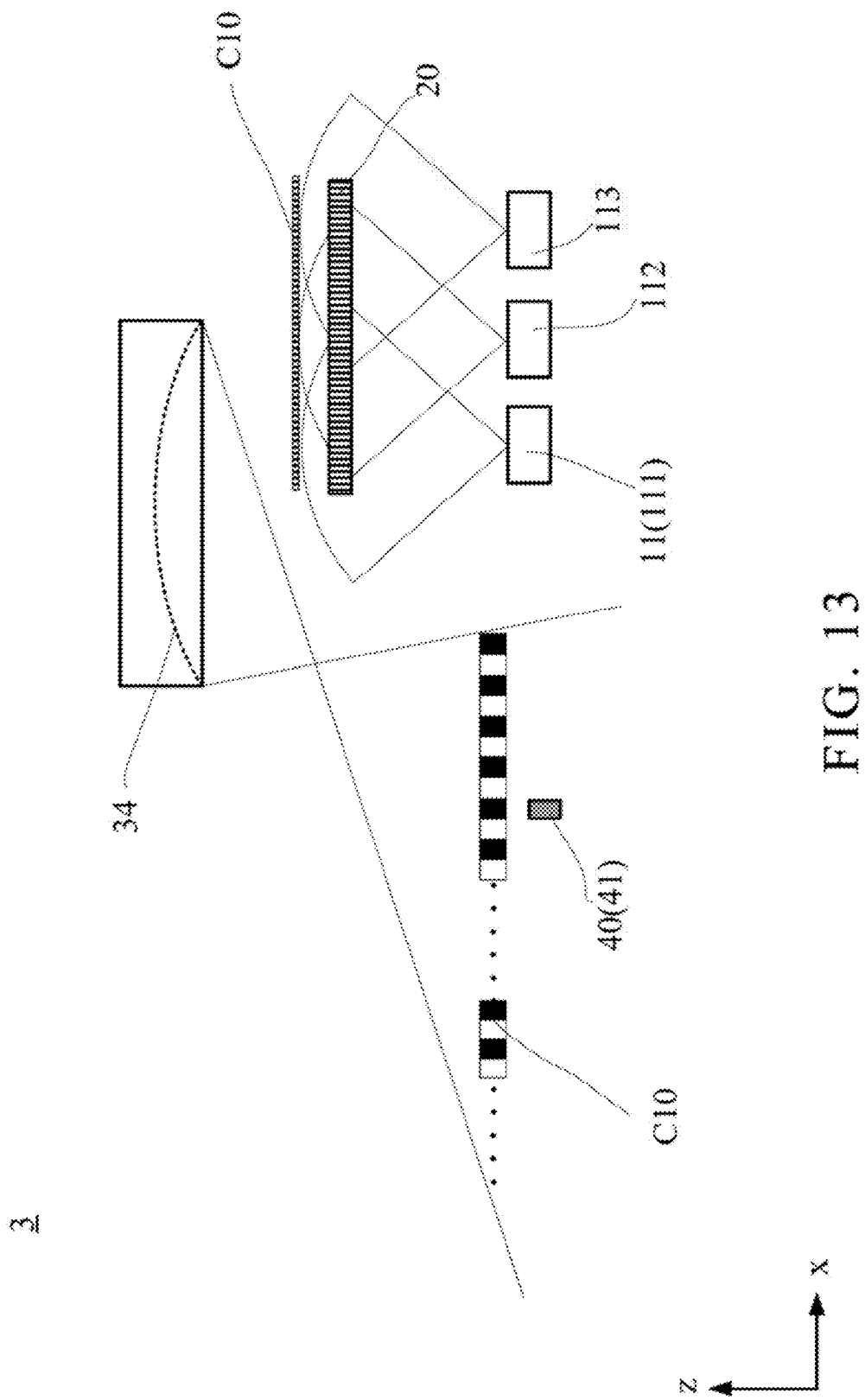
FIG. 13 is a schematic view illustrating operations of the rotary encoder according to the third preferred embodiment of the present invention.

FIG. 13 illustrates a schematic view of the operations of the rotary encoder according to the third preferred embodiment of the present invention. During the operation of the rotary encoder 3, the light source module 10 emits light, and a part of the light passes through the code plate 20 to form an image C10. The image C10 is transferred into the imaging element 34 and is then reflected and imaged by the imaging elements 34 into the optical sensor module 40. When being transferred to the optical sensor module 40, the image C10 is enlarged.

The imaging elements 34 are translated as the optical wheel 30 rotates. Accordingly, the image C10 transferred via the imaging elements 34 is also translated. The optical sensor module 40 can sense the amount and speed of the movement of the image C10 to calculate the amount and speed of the rotation of the optical wheel 30.

As can be known from the above descriptions, the rotary encoder 3 is similar to the rotary encoder 1 or 2 except that the image is reflected to the optical sensing module 40 in the rotary encoder 3 instead of being refracted to the optical sensing module 40 as in the rotary encoder 1. The technical features of the rotary encoder 1 or 2 may also be applied in the rotary encoder 3; for example, a plurality of optical sensors 41 may be used to increase the resolution, or the optical wheel 30 may be provided with a zeroing imaging element 35 and the zeroing imaging element 35 may also comprise a concave mirror.

Figure 14:
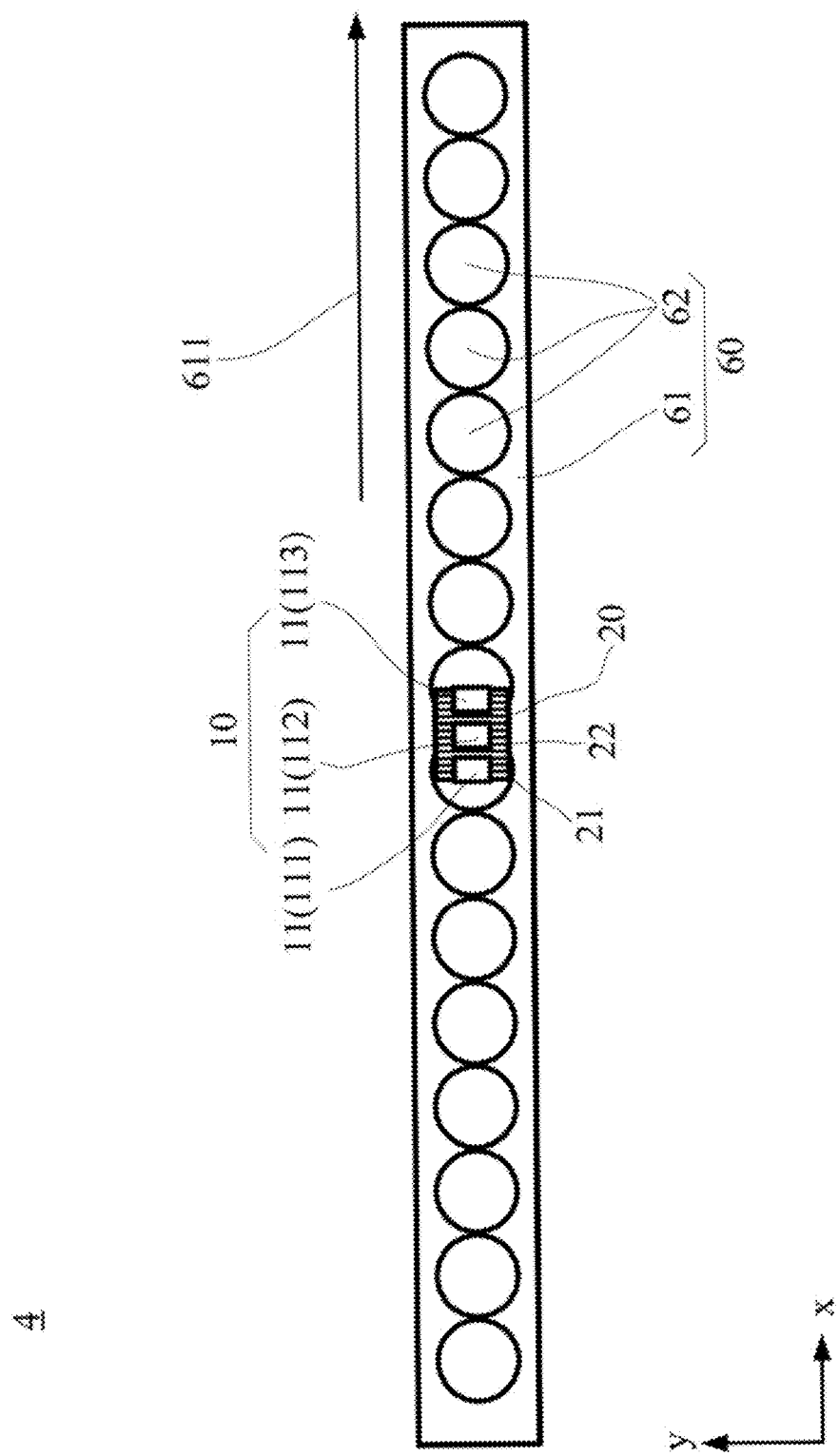
FIG. 14 is a front view of a linear encoder according to a fourth preferred embodiment of the present invention.
Figure 15:
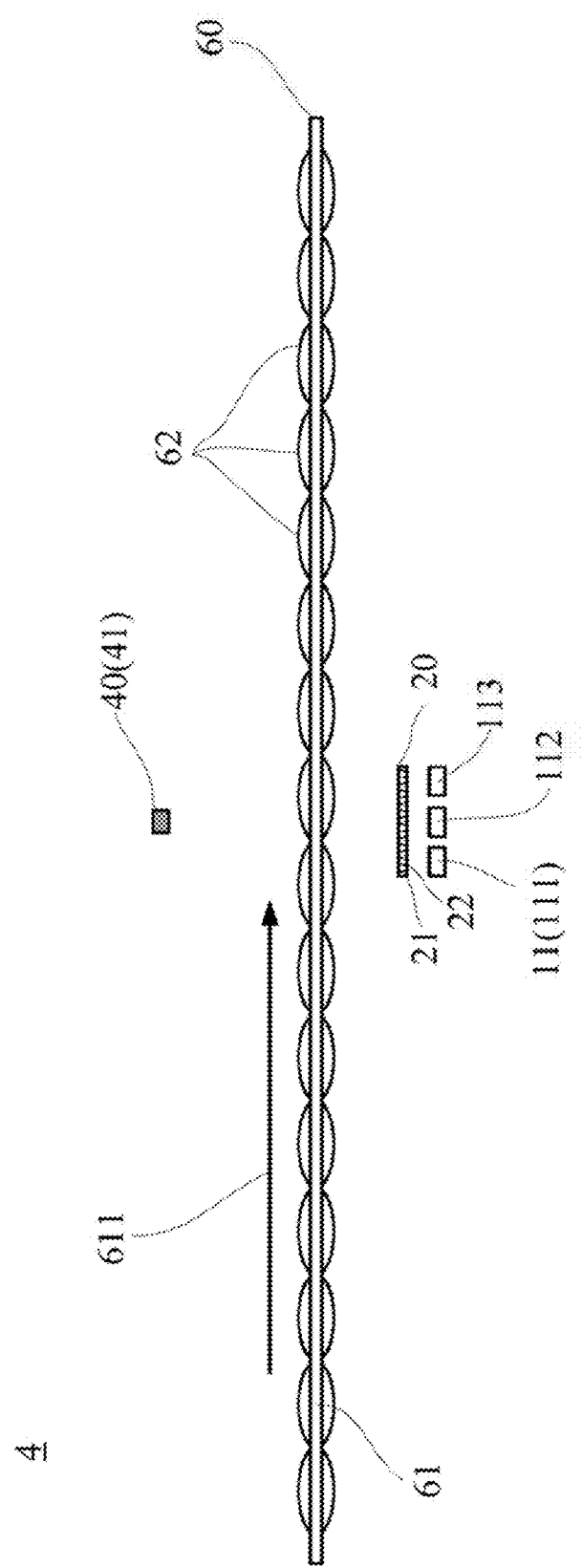
FIG. 15 is a top view of the linear encoder according to the fourth preferred embodiment of the present invention.

FIGS. 14 and 15 illustrate the front view and top view of a linear encoder according to the fourth preferred embodiment of the present invention, respectively. The linear encoder 4 may comprise a light source module 10, a code plate 20, an optical bar 60 and an optical sensor module 40. The light source module 10, the code plate 20 and the optical sensor module 40 are similar to those of the first to the third embodiments except that the light source module 10, the code plate 20 and the optical sensor module 40 may be fixed to a translatable structure (not shown) to move along with the structure; in other words, the light source module 10, the code plate 20 and the optical sensor module 40 are movable.

The optical bar 60 is fixed, and is located in the movement path of the light source module 10, the code plate 20 and the optical sensor module 40. The optical bar 60 comprises a bar body 61 and a plurality of imaging elements 62. The bar body 61 has a longitudinal direction 611, which represents the direction of the long side of the bar body 61 and also the direction in which the light source module 10, the code plate 20 and the optical sensor module 40 move.

The imaging elements 62 are disposed fixedly on the bar body 61 and arranged linearly along the longitudinal direction 611; in other words, the imaging elements 62 are arranged in an array. Additionally, each of the imaging elements 62 has a focal point. Each of the imaging elements 62 may comprise a lens or a concave mirror; in this embodiment, each of the imaging elements 62 is a convex lens.

At least one of the imaging elements 62 can be optically coupled with the code plate 20, and the optical sensor module 40 is also optically coupled with at least one of the imaging elements 62.

The optical bar 60 may be viewed as an optical wheel 30 with an infinite radius, so the linear encoder 4 operates in a way similar to the rotary encoders 1 to 3. That is, a portion of light emitted by the light source module 10 can pass through the code plate 20 to form an image with a plurality of bright stripes and a plurality of dark stripes; the image can be transferred via the imaging elements 62 to the optical sensor module 40; when the light source module 10, the code plate 20 and the optical sensor module 40 are translated together relative to the optical bar 60, the image is also translated correspondingly; as the image is translated, the optical sensor module 40 is irradiated by the bright stripes at intervals to output signals; if the image moves faster, the frequency at which the optical sensor module 40 outputs the signals also becomes higher; and the moving speed of the light source module 10, the code plate 20 and the optical sensor module 40 can be derived from the frequency at which the signals are outputted.

Besides the operation mode described above, other operation modes of the first to the third embodiment may also be applied to the linear encoder 4 of this embodiment. Also, other features described in the first to the third embodiments may be applied to the linear encoder 4 of this embodiment.

According to the above descriptions, the rotary encoder and the linear encoder of the present invention have a number of advantages listed as follows:

1. Because it is unnecessary to produce a plurality of light transmitting regions with accurate dimensions, the optical wheel and the optical bar of the present invention are easy to manufacture.

2. Even when the imaging elements of the optical wheel or the optical bar are covered with dusts or particles, the image formed by the imaging elements will not be readily affected.

3. As compared to the conventional code disks, the code plate of the present invention has a smaller number of light transmitting regions, and the size of the light transmitting regions can be made to be larger in size, so the code plate is easier to manufacture.

4. By increasing the number of optical sensors, the resolution of the rotary encoder and the linear encoder can be significantly improved.

5. The image can be enlarged by the imaging elements to make it easier for the optical sensor(s) to sense the movement of the bright strips of the image.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A rotary encoder, comprising:
    a light source module, disposed fixedly in the rotary encoder for emitting light;
    a code plate, disposed fixedly in the rotary encoder and optically coupled with the light source module, wherein the code plate has a plurality of light transmitting regions alternating with a plurality of light non-transmitting regions for forming an image with a plurality of bright stripes and a plurality of dark stripes by the light passing through the code plate;
    an optical wheel, comprising a wheel body having a rotation axis and a plurality of imaging elements disposed fixedly on the wheel body and arranged annularly around the rotation axis, wherein each of the imaging elements has a focal point, wherein the wheel body is pivotally disposed in the rotary encoder, and at least one of the imaging elements is optically coupled with the code plate for enlarging the image; and
    an optical sensor module, disposed fixedly in the rotary encoder and optically coupled with at least one of the imaging elements for being irradiated by one of the bright stripes of the enlarged image.

2. The rotary encoder of claim 1, wherein the optical wheel is located between the code plate and the optical sensor module, and each of the imaging elements comprises a lens.

3. The rotary encoder of claim 2, wherein each of the lenses has an optical axis substantially parallel to the rotation axis.

4. The rotary encoder of claim 2, wherein each of the lenses has an optical axis intersecting with the rotation axis.

5. The rotary encoder of claim 2, wherein each of the lenses is a cylindrical lens.

6. The rotary encoder of claim 1, wherein the code plate and the optical sensor module are located at a same side of the optical wheel, and each of the imaging elements comprises a concave mirror.

7. The rotary encoder of claim 1, further comprising a zeroing imaging element, disposed on the wheel body.

8. The rotary encoder of claim 7, wherein the zeroing imaging element comprises a lens or a concave mirror.

9. A method for generating a zeroing signal of a rotary encoder, comprising following steps:
    rotating the optical wheel of the rotary encoder of claim 7;
    making a plurality of light sources of the light source module emit light in turn according to a switching speed higher than a rotating speed of the optical wheel;
    forming another image with a plurality of bright stripes and a plurality of dark stripes by the lights, emitted from one of the light sources, passing through the code plate and the zeroing imaging element; and
    generating the zeroing signal by the optical sensor module when the optical sensor module senses at least one of the bright stripes of the another image.

10. The rotary encoder of claim 1, wherein the light source module comprises a plurality of light sources.

11. The rotary encoder of claim 1, wherein the optical sensor module comprises a plurality of optical sensors.

12. The rotary encoder of claim 1, wherein each of the light transmitting regions is classified as a non-overlapping light transmitting region or an overlapping light transmitting region.

13. The rotary encoder of claim 12, wherein a resolution of the rotary encoder is at least: 360 degrees divided by a number of the imaging elements and a number of the non-overlapping light transmitting regions.

14. A linear encoder, comprising:
    a light source module for emitting light;
    a code plate, optically coupled with the light source module, wherein the code plate has a plurality of light transmitting regions alternating with a plurality of light non-transmitting regions for forming an image with a plurality of bright stripes and a plurality of dark stripes by the light passing through the code plate;
    an optical bar, comprising a bar body and a plurality of imaging elements, wherein the bar body has a longitudinal direction, the imaging elements are disposed fixedly on the bar body and arranged linearly along the longitudinal direction, each of the imaging elements has a focal point, and at least one of the imaging elements is optically coupled with the code plate for enlarging the image; and an optical sensor module, optically coupled with at least one of the imaging elements for being irradiated by one of the bright stripes of the enlarged image;

wherein, the light source module, the code plate and the optical sensor module are capable of being translated against the optical bar.

15. The linear encoder of claim 14, wherein each of the imaging elements comprises a lens or a concave mirror.

* * * * *